INVENTOR.
Andrew Gabor
BY
Lane, Aitken, Dunner & Ziems
ATTORNEYS

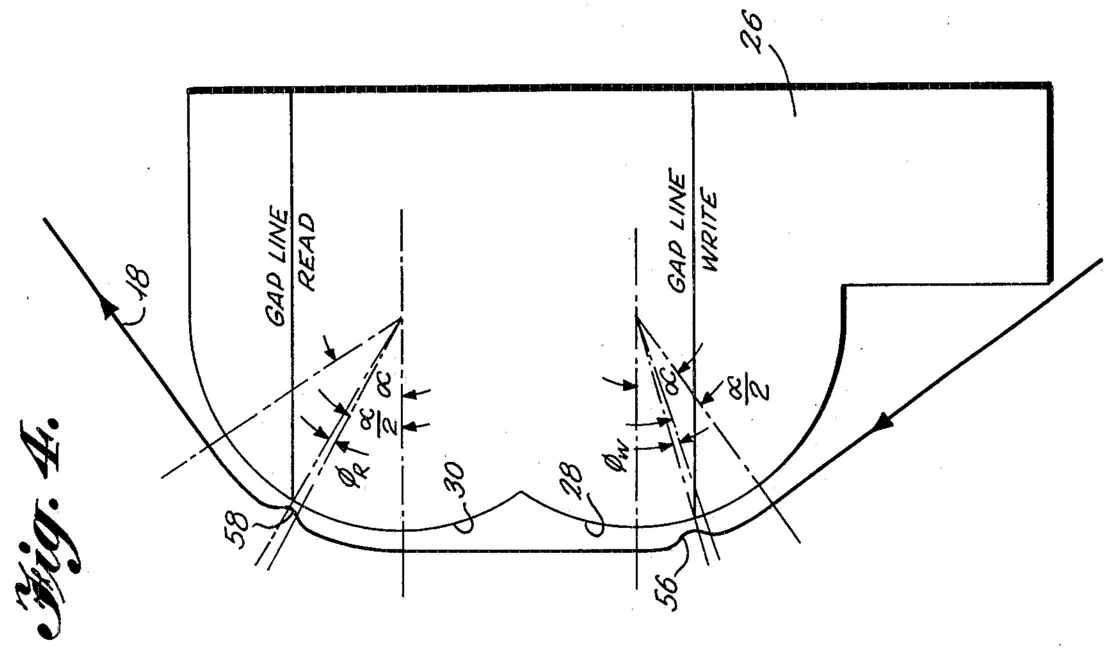
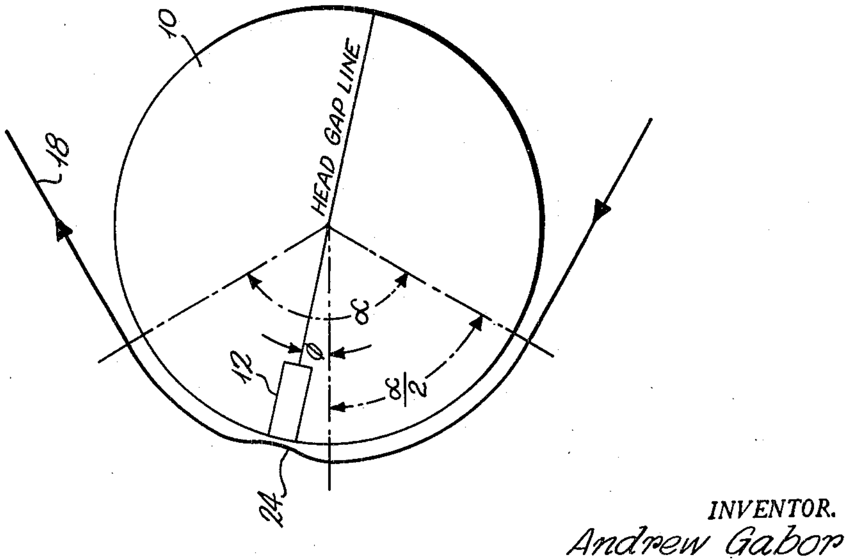
Fig. 3.
INVENTOR.
Andrew Gabor
BY
Lane, Aitken, Dunner & Ziems
ATTORNEYS INVENTOR.
Andrew Gabor
BY
Lane, Aitken, Dunner & Ziems
ATTORNEYS United States Patent Office 3,512,145
Patented May 12, 1970

3,512,145

AERODYNAMIC TRANSDUCER DISPLACED WITH RESPECT TO THE CENTER OF TAPE WRAP

Andrew Gabor, Huntington, N.Y., assignor to Potter Instrument Company, Inc., Plainview, N.Y., a corporation of New York Continuation-in-part of application Ser. No. 385,727, July 28, 1964. This application Mar. 21, 1966, Ser. No. 535,781
Int. Cl. B65h 59/12, 77/00; G11b 15/64
U.S. Cl. 340—174.1 13 Claims

ABSTRACT OF THE DISCLOSURE

A transducing head module and drive means for magnetic storage tapes in which a head gap is located on the module at a point displaced from the normal or static center of wrap made by the tape on a rouned head surface so that the gap is positioned beneath a dip in the tape developed when the tape is passed over the surface at speeds to elevate the tape aerodynamically relative to the rounded head surface.

This is a continuation-in-part of copending application Ser. No. 385,727, filed July 28, 1964, by Andrew Gabor and assigned to the assignee of the present invention, now U.S. Pat. No. 3,378,826. Subject matter which is common to this invention and the invention disclosed in the aforesaid copending application is incorporated herein.

Generally, the invention disclosed in the aforementioned copending application relates to a storage apparatus by which information is stored on a plurality of magnetic tape loops carried in a cartridge which is interchangeable with other cartridges containing additional tape loops. The tape loops of the cartridge in use are selectively driven relative to a transducing head assembly which in turn is selectively positionable so that transducer heads carried thereon are registered with information tracks on the respective tape loops. The speed at which the tape loops are driven relative to the transducing head module causes the tape to float aerodynamically over the curved surface of the module.

The present invention is predicated in good measure on the discovery that, under the influence of the aerodynamic effect resulting from the tape being driven at high speeds relative to the transducing head module, optimum head gap positioning under the conditions existing during transducing operations is spaced in the direction of tape movement from the center of the wrap angle made by the tape about the transducing head module. Among the objects of the present invention are the improvement of magnetic tape transducing operations under high operating speeds; compensation of head gap position for aerodynamic effects occurring during such transducing operations; and the provision of an improved read-write head module by which optimum recording and reading operations may be performed on magnetic tapes.

Other objects and further scope of applicability of the present invention will become apparent from the detailed description taken in conjunction with the accompanying drawings in which:

FIG. 3 is a schematic view illustrating further, the aerodynamic phenomena resulting from a tape moving at high speeds about a transducing head having a curved surface;

FIG. 4 is a schematic view illustrating the aerodynamic phenomenon resulting during high speed travel of a tape relative to a transducing head having a multiple curved surface;

Figures 1, 2:
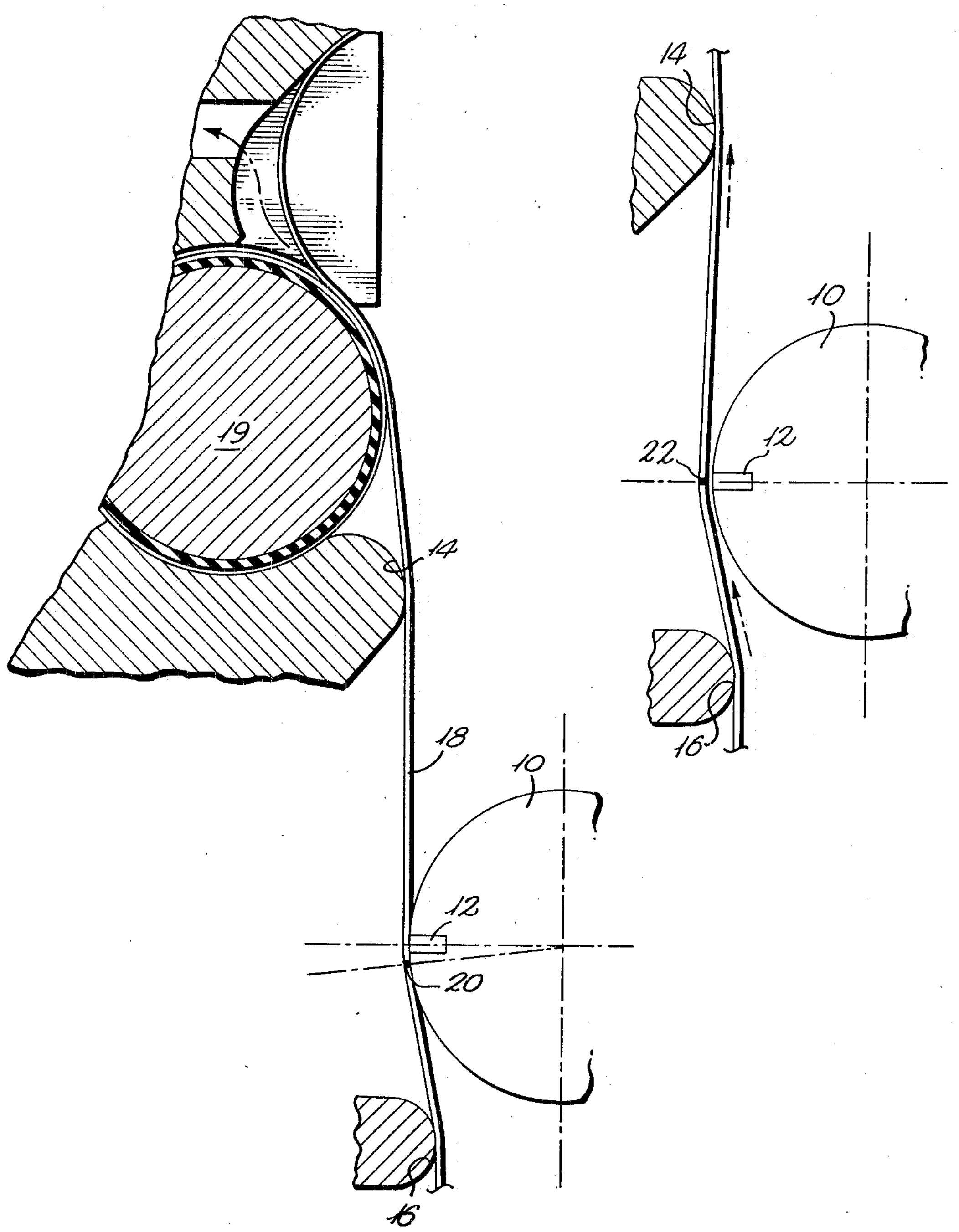
FIG. 1 is a schematic view illustrating the position that a tape loop would assume relative to a transducing head module at static or rest conditions.
FIG. 2 is a similar view illustrating the position of a tape loop during transducing operations.

As shown in FIGS. 1 and 2, a transducing head module 10 having a transducing head 12 therein is positioned relative to a pair of upper and lower guide surfaces 14 and 16, respectively. In FIG. 1, a portion of a magnetic tape loop 18 is shown as it would be if it were positioned adjacent the head carrier or module 10 as it would be tensioned during a transducing operation, but not moving. It will be understood that in actual operation, when the tape loop 18 is tensioned to assume the position shown in FIG. 1, the tape is being driven by a capstan 19 at high speeds so that the static condition illustrated in FIG. 1 does not actually occur under any conditions of transducing operations carried out on a storage apparatus.

As shown in FIG. 1, the tape 18 is wrapped about and in contact with a portion of the cylindrical surface of the head module 10 with the center of wrap at a point 20. Although well established principles of magnetic tape transducing operations suggest that optimum transducing efficiency would obtain where the center of the head 12 was aligned with the center of wrap 20, it was found, as disclosed in the aforementioned copending application, that the optimum position for the head 12 was at a point displaced from the center of wrap 20 in the direction of tape travel. The explanation given for this location of the head 12 in the aforementioned copending application was that the center of wrap, when the tape was driven at normal transducing velocity, shifted to a point 22 as shown in FIG. 2 of the drawings, due to aerodynamic effects which operate to space the tape slightly from the surface of the head module 10 and create an air bearing. This explanation of the center of wrap shifting as the tape undergoes the change between static and dynamic conditions was predicated on the reasoning that because optimum transducing efficiency was achieved where the head 12 was displaced in the direction of tap movement relative to the static center of wrap as depicted by FIG. 1 of the drawings, and because it had been well established that the center of wrap in normal transducing operations was the most efficient location of the transducing head, that therefore, the center of wrap must have shifted to the point 22 aligned with the head 12 during transducing operations. Further and careful observation of the path taken by the tape 18 about the head module 10 has confirmed that the optimum position of the head 12 for transducing operations is, as depicted by FIGS. 1 and 2 of the drawings, downstream from the center of wrap made by the tape when it is not moving relative to the transducing head. Additionally, however, it has been found that the distance the tape is displaced from the curved or cylindrical surface of the head module 10, or the "flying altitude" of the tape, varies along the curved or cylindrical path due to aerodynamic effects. In particular, and as is illustrated in FIG. 3 of the drawings, observation of the tape flight has revealed a single, well-defined, fairly sharp and stable dip 24 in the flying altitude of the tape, which continues uniformly across the width of the tape. It became apparent that the reason optimum transducing efficiency was achieved with the head positioned relative to the center of wrap as shown in FIGS. 1 and 2, was that the head in this position is located at the point in the tape path over the curved surface of the head module where the altitude of the tape was lowest. In other words, location of the head 12 under the dip 24 as shown in FIG. 3 produces optimum transducing efficiency because it is at this point that the tape, when under the influence of aerodynamic effects, approaches the rounded surface of the module most closely. Hence, and with reference to FIG. 3, where the angle $\alpha$ is the angle of wrap and $\alpha/2$ is the center of wrap, the head 12 is displaced in the direction of tape travel by an angle $\phi$ to position it beneath the dip 24.

Since, in accordance with the aerodynamic phenomena depicted by FIG. 3 of the drawings, only one dip 24 occurs in the tape as it passes over the surface of the head module 10, it is not possible to achieve optimum efficiency with two heads 12 on the surface of the head module 10, such as, for example, a read head and a write head. In accordance with a further feature of the present invention, therefore, and as shown in FIGS. 4, 5 and 6 of the drawings, a head module 26 is provided having a pair of adjacent rounded, preferably cylindrical surfaces 28 and 30.

Figures 5, 6:
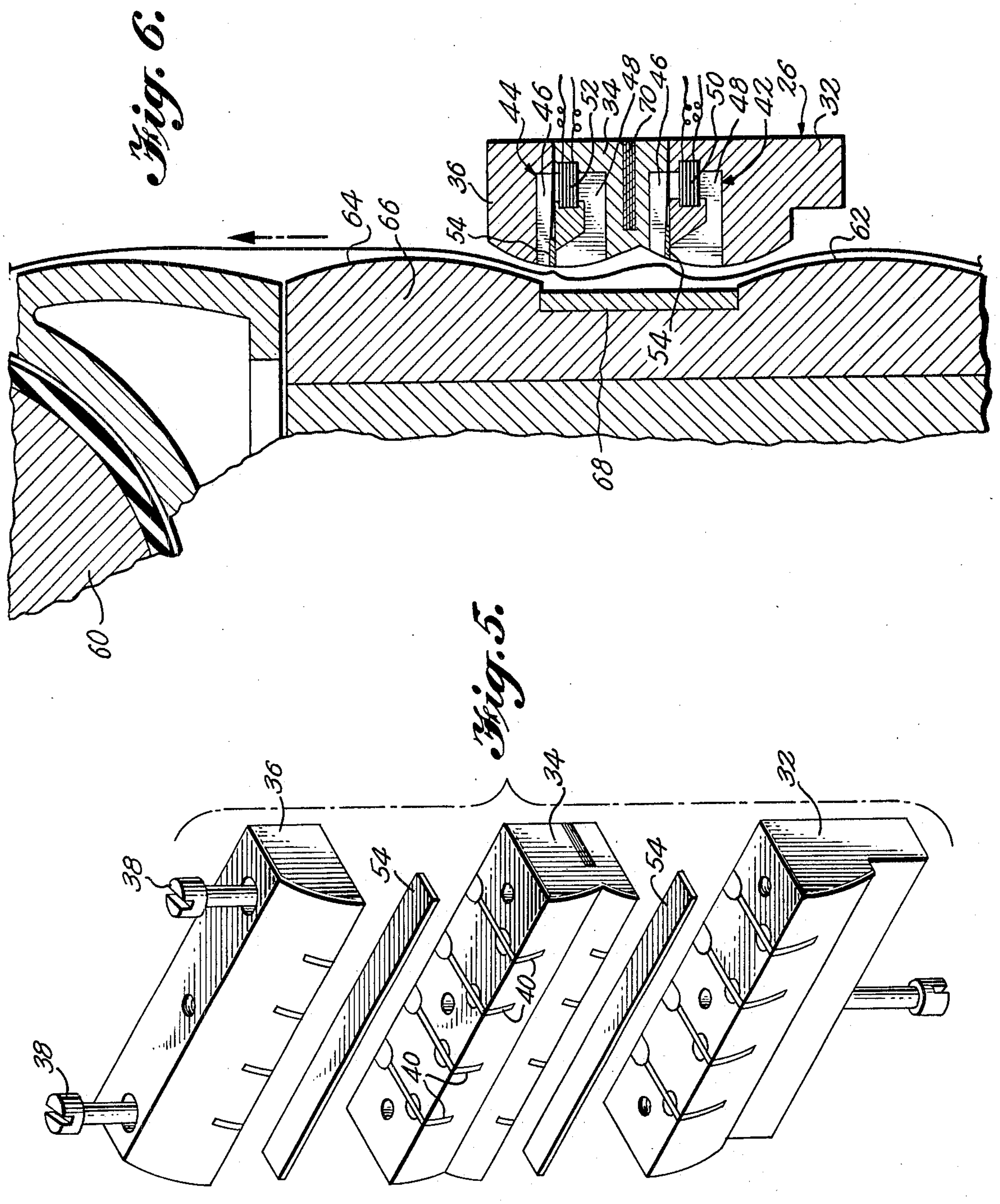
FIG. 5 is a perspective exploded view illustrating a modified head module in accordance with this invention.
FIG. 6 is a cross section of the modified head module with a fragmentary illustration of the means by which the tape is guided over the surface thereof in practice.

As shown in FIGS. 5 and 6, the module 26 is an assembly of three aluminum blocks 32, 34 and 36, respectively, adapted to be retained against one another by assembly screws 38. Each of the head modules shown is designed to carry four write heads and four read heads. To this end, the blocks 32, 34 and 36 are provided with appropriately spaced slots 40 to receive these heads. In FIG. 6, the write heads are designated generally by the reference numeral 42 and received in the slots between the blocks 32 and 34 whereas the read heads, designated generally by the reference numeral 44, are received in the slots 40 between the blocks 34 and 36.

The heads 42 and 44 are identical in structure and each includes two core sections 46 and 48 received within the slots 40 between the aluminum blocks 32, 34 and 36. Specifically, the core section 46 of the read head 44 is received in the block 36 whereas the core section 48 of the read head 44, as well as the core section 46 of the write head 42, are received in the slots of the block 34. Similarly, the core section 48 of the write head 42 is received in the slot 40 of the block 32. Each of the core sections is a laminated stack of ferromagnetic material in accordance with well established principles of electromagnetic sensing devices. Further, a write coil 50 is positioned about the core section 48 of the write head 42 whereas a read coil 52 is similarly positioned about the core section 48 of the read head 44.

To establish a substantially closed magnetic flux path on both sides of a gap in each of the heads 42 and 44, strips of mica 54 are sandwiched between the blocks 32, 34 and 36 adjacent the rounded surfaces 28 and 30 to establish the head gaps for each of the heads 42 and 44. When the assembly screws 38 are drawn tight, the slight deformation that occurs as the blocks 32, 34 and 36 are drawn together establishes, as shown in FIG. 6, a substantially continuous core on both sides of the mica blocks 54 and extending through the coils 50 and 52.

The arrangement of the heads 42 and 44 in the module 26 in relation to the curved surfaces 28 and 30 is depicted by FIG. 4 of the drawings in somewhat exaggerated proportions. The respective gap lines established by the mica blocks 54 and slightly separating the forward end of the blocks 42, 34 and 36, intercept the curved surfaces 28 and 30 at points displaced from the center of the wrap angle $\alpha$ by an angle $\phi$ to be positioned immediately adjacent dips 56 and 58 in the tape 18 as it it moved relative to the module 26 by a capstan 60. Thus, it will be appreciated that the principle of operation illustrated schematically in FIG. 3 of the drawings is carried forward to the head module 26 as illustrated schematically in FIG. 4. In other words, the respective write and read heads are positioned relative to the curved surfaces 28 and 30 in such a manner to underlie the dips 56 and 58 formed aerodynamically as the tape 18 is moved at high speeds relative to the curved surfaces.

In practice, the tape 18 is guided relative to the curved surfaces 28 and 30 of the module 26 by rounded surfaces 62 and 64 provided on a guide element 66. The surfaces 62 and 64 are separated by a bar of ferromagnetic material 68 to assist in the elimination of cross talk between the write and read heads 42 and 44, respectively. Also, a cross talk shield 70 is provided between the write and read heads within a slot formed in the block 34 as shown in FIG. 6 of the drawings.

Thus it will be appreciated that by this invention a transducing head module is provided by which optimum transducing efficiency may be achieved for both write and read operations during the travel of a magnetic tape at high velocities past the respective write and read heads. Since variations in the particular form of head module described in here will be apparent to those skilled in the art, it is to be understood that the foregoing description is illustrative of a preferred embodiment only, not limiting, and that the true spirit and scope of the present invention is to be interpreted by reference to the accompanying claims.

The invention claimed is:

1. Means for performing transducing operations on a magnetic tape comprising: a transducing head having a rounded surface, means to drive the magnetic tape over said rounded surface at speeds causing the tape to float aerodynamically out of contact with said surface and to dip toward said surface along a line transverse to the direction of tape flight, and a magnetic gap in said head positioned along said line under said dip.

2. The apparatus recited in claim 1 in which said gap is positioned at a point spaced in the direction of tape movement relative to the center of wrap made by said tape about said rounded surface.

3. The apparatus recited in claim 1 in which said transducing head has a pair of adjacent, tandem rounded surfaces thereby causing said tape to dip toward each of said surfaces and including a read head gap under one of said dips and a write head gap under the other of said dips in said pair of surfaces, respectively.

4. The apparatus recited in claim 3 including guide means spaced from said rounded surfaces and including a further pair of rounded surfaces, and cross-talk shielding means between said further rounded surfaces.

5. The apparatus recited in claim 4 including further cross-talk shielding means in said head and between said head gaps.

6. A memory comprising: a storage tape, a head module having a rounded surface, a transducing head for performing transducing operations on said storage tape and mounted in said rounded surface, means to drive said tape over said rounded surface at speeds causing the tape to float aerodynamically out of contact with said surface and to dip toward said surface along a line transverse to the direction of tape flight, said head being positioned in said module under said dip.

7. A memory comprising: a storage tape, a head carrier having first and second rounded surfaces, means to drive said tape over said surfaces under conditions causing the tape to float aerodynamically out of contact with said surfaces and to form a pair of dips in said tape, one such dip toward each of said surfaces, a first transducing head on said carrier positioned in said first rounded surface under the dip toward said first surface and a second transducing head in said second rounded surface under the dip said tape makes towards said second surface.

8. A memory comprising: a storage tape, a head carrier defining a rounded surface, a transducing head for performing transducing operations on said storage tape mounted in said rounded surface, drive means to drive said tape at a high speed past said transducing head, and guide means to position said tape so that it wraps around said rounded surface, said guide means being positioned relative to said head carrier so that the center of wrap of said tape about said rounded surface that would occur if the tape were not moving is spaced from said transducing head in the opposite direction to that in which said tape is driven by said drive means.

9. A memory comprising: a storage tape, a head carrier defining a rounded surface, a transducing head for performing transducing operations on said storage tape mounted in said rounded surface, drive means to drive said tape at a high constant speed past said transducing head, guide means to position said tape so that it wraps around said rounded surface, said guide means being positioned relative to said head carrier so that the center of wrap of said tape about said rounded surface that would occur if the tape were not moving is spaced from said transducing head in the opposite direction in which said tape is driven by said drive means by an amount equal to the aerodynamic shift of said center of wrap that occurs as a result of the high speed with which said tape is driven by said drive means.

10. A memory comprising: a storage tape, a head carrier defining a cylindrical surface, a transducing head for performing transducing operations on said storage tape mounted in said cylindrical surface, drive means to drive said tape at a high speed past said transducing head, and guide means to position said tape so that it wraps around said rounded surface, said guide means being positioned relative to said head carrier so that the center of wrap of said tape about said cylindrical surface that would occur if the tape were not moving is spaced from said transducing head in the opposite direction to that in which the tape is driven by said drive means.

11. The method of performing transducing operations on a magnetic storage tape, said method comprising the steps of: passing the magnetic tape about a transducing head having a rounded surface at speeds causing the tape to float aerodynamically out of contact with said surface and to dip toward said surface along the line transverse to the direction of tape flight, and positioning a magnetic gap in said head of along said transverse line under said dip.

12. The method recited in claim 11 wherein said tape is passed over a pair of adjacent, tandem rounded surfaces in the transducing head thereby to develop a dip toward each of said surfaces, and position a read head gap under one of said dips and a write head gap under the other of said dips developed during tape passage over said surfaces.

13. The method of performing transducing operations on a magnetic storage tape, said method comprising the steps of: passing the magnetic tape about a convex rounded surface on a transducing head at speeds causing the tape to float aerodynamically out of contact with said surface, and positioning a magnetic head gap in said surface downstream in the direction of tape travel from the center of wrap of said tape about the rounded surface that would occur if the tape were not moving.

References Cited

UNITED STATES PATENTS

| | | | |
|---|---|---|---|
| 3,143,267 | 8/1964 | Maxey | 340—174.1 |
| 3,151,796 | 10/1964 | Lipschutz | 340—174.1 |
| 3,170,045 | 2/1965 | Baumeister et al. | 340—174.1 |
| 3,327,916 | 6/1967 | Wiedenhammer et al. | 340—174.1 |
| 3,273,896 | 9/1966 | Maeder | 179—100.2 |
| 3,416,149 | 12/1968 | Stahler | 340—174.1 |
| 3,418,434 | 12/1968 | Groenewegen | 340—174.1 |
| 3,422,411 | 1/1969 | Smith | 340—174.1 |
| 3,435,442 | 3/1969 | Ma et al. | 179—100.2 |

BERNARD KONICK, Primary Examiner

V. P. CANNEY, Assistant Examiner

U.S. Cl. X.R.

179—100.2